(12) United States Patent
Boeck

(10) Patent No.: US 10,774,686 B2
(45) Date of Patent: Sep. 15, 2020

(54) TURBINE CENTER FRAME WITH CENTERING ELEMENT AND SPACER ELEMENT

(71) Applicant: MTU Aero Engines AG, Munich (DE)

(72) Inventor: Alexander Boeck, Kottgeisering (DE)

(73) Assignee: MTU Aero Engines AG, Munich (DE)

( * ) Notice: Subject to any disclaimer, the term of this patent is extended or adjusted under 35 U.S.C. 154(b) by 424 days.

(21) Appl. No.: 15/993,755

(22) Filed: May 31, 2018

(65) Prior Publication Data

US 2018/0347402 A1  Dec. 6, 2018

(30) Foreign Application Priority Data

Jun. 1, 2017 (EP) ..................... 17173968

(51) Int. Cl.
| | | |
|---|---|---|
| *F01D 25/24* | (2006.01) | |
| *F01D 9/02* | (2006.01) | |
| *F01D 11/00* | (2006.01) | |

(52) U.S. Cl.
CPC ............ *F01D 25/246* (2013.01); *F01D 9/02* (2013.01); *F01D 11/005* (2013.01); *F01D 25/24* (2013.01); *F05D 2240/11* (2013.01); *F05D 2240/14* (2013.01); *F05D 2300/6033* (2013.01)

(58) Field of Classification Search
CPC ...... F01D 25/24; F01D 25/246; F01D 11/005; F05D 2240/11; F05D 2300/6033
See application file for complete search history.

(56) References Cited

U.S. PATENT DOCUMENTS

2016/0245102 A1  8/2016  Freeman et al.

FOREIGN PATENT DOCUMENTS

EP         0924387 A2    6/1999

*Primary Examiner* — Kenneth J Hansen
*Assistant Examiner* — Maxime M Adjagbe
(74) *Attorney, Agent, or Firm* — Barlow, Josephs & Holmes, Ltd.

(57) ABSTRACT

The invention relates to a turbine center frame for an aircraft gas turbine, with a plurality of first components and a plurality of second components, which, in the peripheral direction, are arranged alternately next to one another and, in a radial direction, bound a flow duct conveying hot gas, wherein the first components each have two first overlapping segments and the second components each have two second overlapping segments with a respective region of the transitioning from a first component to a second component or vice versa, a first overlapping segment and a second overlapping segment are arranged overlapping, and with at least one centering element, at which the first components and the second components are supported along the peripheral direction and in a radial direction with the first components and the second components essentially centered with respect to a central axis of the turbine center frame.

18 Claims, 2 Drawing Sheets

TURBINE CENTER FRAME WITH CENTERING ELEMENT AND SPACER ELEMENT

BACKGROUND OF THE INVENTION

Figure 1:
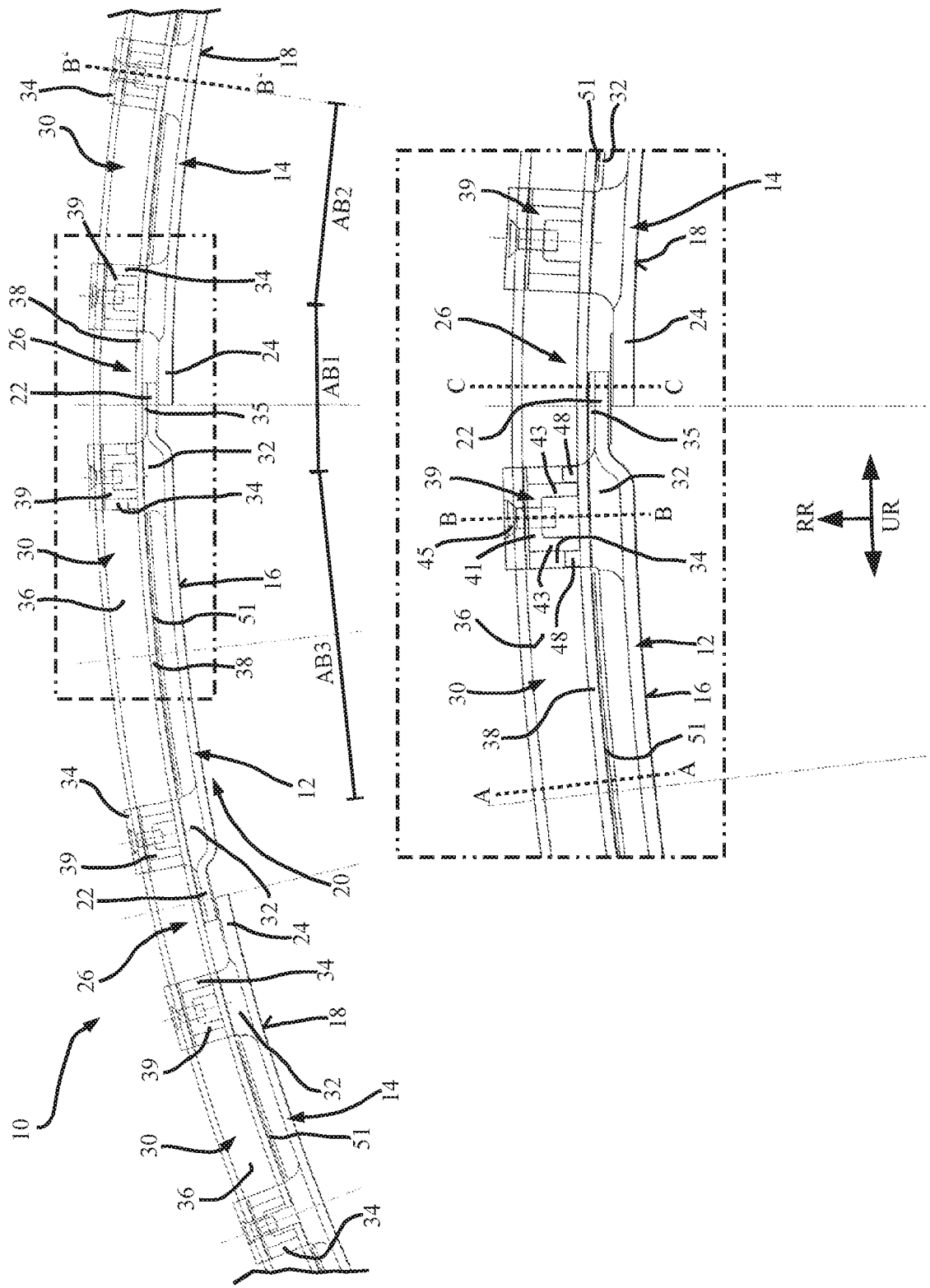

The present invention relates to a turbine center frame for a gas turbine, in particular an aircraft gas turbine, with a plurality of first components and a plurality of second components, which, in the peripheral direction, are arranged alternately next to one another and, in the radial direction, bound a flow duct conveying hot gas, wherein the first components each have two first overlapping segments and the second components each have two second overlapping segments in such a way that, in a particular region of the transition from a first component to a second component or vice versa, the first overlapping segment and the second overlapping segment are arranged overlapping, and with at least one centering element, at which the first components and the second components are supported along the peripheral direction and in the radial direction in such a way that the first components and the second components are arranged essentially centered with respect to a central axis of the turbine center frame, wherein the first components are formed identically to the second components or the first components are different from the second components.

Directional statements, such as "axial" or "axially," "radial" or "radially," and "peripheral," are fundamentally to be understood as being in relation to the machine axis of the gas turbine, provided that something different does not ensue from the context explicitly or implicitly. The machine axis of the gas turbine may also be referred to as the central axis of the turbine center frame.

For turbine center frames, the components of the flow duct conveying hot gas are, as a rule, connected by of so-called ground-down overlaps. Therefore, at an axially front region of the turbine center frame, which may also be referred to as an inlet, it is necessary to connect these components via so-called centering strips in the peripheral direction. Centering strips of this kind prevent any outward tilting and, in particular, any radial outward tilting in the region of the ground-down overlap. The centering strip is thereby inserted axially into grooves that are formed on the components. Furthermore, the centering strip is secured by a securing ring.

In the field of gas turbines and, in particular, of the turbine center frame for gas turbines, the utilization of alternative materials, such as, for example, ceramic fiber composite materials, (ceramic matrix composites (CMC)), is being increasingly investigated in order to achieve weight savings and improvements in efficiency in comparison to conventional metal components. Accordingly, the above-described conventional arrangements for centering components made of alternative materials do not come into consideration. In particular, it is difficult to provide (radially) narrow grooves in components made of alternative materials, without thereby having to accept drawbacks in the strength of the components.

SUMMARY OF THE INVENTION

The object of the invention is to make available a turbine center frame in which the above drawbacks in regard to alternative materials are avoided.

For achieving this object, it is proposed that the first components and the second components are produced from a ceramic matrix composite and that, at each first component and at each second component, at least one first supporting segment and at least one second supporting segment are provided, wherein the first supporting segment and the second supporting segment are formed in such a way that they impinge against the centering element from different sides in the radial direction, and wherein the second supporting segment impinges against the centering element by a spacer element.

The impingement or resting of the first and second supporting segments against different sides of the centering element makes possible a secure centering of the first and second components over the entire periphery. The known narrow grooves in the radial direction, which have already been described above, are thereby, so to speak, broken up and distributed. As a result of the insertion of a spacer element, it is possible to bridge the distance between the second supporting segment and the centering element.

A "centering" of the first and second components in the sense of the present disclosure may be understood to mean, in particular, that the surfaces of the first and second components bounding the flow duct adjoin one another in a flush manner in the peripheral direction and, therefore, no radial jump occurs in the peripheral direction at the point of transition. In addition, the surfaces bounding the flow duct can lie, at least approximately, on a central surface of a common truncated cone or a common cylinder, the central axis of which coincides with the central axis of the turbine center frame.

The first supporting segment and the second supporting segment can be produced from the ceramic matrix composite. In this case, the first supporting segment can be designed as a radial projection and, in particular, as a radial thickening, of a corresponding first component or of a corresponding second component. Such a radial projection or a radial thickening can be correspondingly laminated during its production from a ceramic matrix composite.

Furthermore, all radial projections can impinge against the centering element from the same first side in the radial direction. The first side can thereby be the radially outer side or the radially inner side of the centering element.

The second supporting element can be designed as hook-shaped and, in particular, as an L-shaped hook. Such a hook-shaped supporting element can be chosen in terms of its dimensions in such a way that it can be produced from a ceramic matrix composite and, in particular, can be laminated. In this case, in particular, it is possible to form bent or curved regions of the hook with such radii that the laminate layers in such regions are not kinked or broken. The L-shaped hook extends from the corresponding first component or second component mainly in the radial direction and in the axial direction, in particular; this means that the two arms of the L extend essentially in the radial direction and in the axial direction. These two arms of the hook can have a length in the respective direction that is chosen in such a way that a production from a ceramic matrix composite is possible. Accordingly, it is possible with the hook-shaped design of the second supporting segment to achieve an adequate strength of the second support segment or second supporting segments.

Furthermore, all hook-shaped second supporting segments can engage behind the spacer element and impinge from a same second side in the radial direction. In this case, the second side can be the radially outer side or the radially inner side of the centering element or of the spacer element. In each case, the already above-discussed first side and the second side are different (radial) sides of the centering element or of the spacer element.

The centering element can have a centering segment that extends in the axial direction and in the peripheral direction, wherein the first supporting segments and the corresponding spacer elements each rest against the centering segment, in particular on opposite-lying sides of the centering segment, and wherein the second supporting segments each rest against the corresponding spacer element. The centering element accordingly corresponds essentially to a kind of spring element, which is mounted between the first and second supporting segments or between the first supporting segments and the spacer elements, somewhat in analogy to the mounting of a conventional spring in a conventional groove, wherein it is noted once again that, in the case of the centering presented here, no continuous groove is provided in the first and second components.

In many embodiments, the centering element is a centering strip. The centering strip can be ring-shaped in form. Alternatively, it is also possible to provide a plurality of centering strips, each of which can have the form of ring segment. Each centering strip can thereby be provided for the centering of two or more components.

The spacer element can be dimensioned in such a way that it bridges a radial distance between the second supporting segment and the centering element. In this case, the spacer element can be connected to the second supporting segment by a rivet connection. In the second supporting segment, it is thereby possible to provide a corresponding opening, through which a rivet can be inserted into a corresponding opening in the spacer element.

The spacer element can have the form of an angled U-profile, wherein the base of the U-profile faces the rear-engaging second supporting segment, and wherein the arms of the U-profile extend essentially in the radial direction and are supported on the centering element. In the base of the U-profile, it is also possible to provide the opening for the rivet. In the state in which the spacer element is connected to the second support segment, a radially inner-lying part of the rivet or of the rivet connection can be accommodated between the two arms of the U-profile.

At the centering element, it is essentially possible to provide securing projections that extend in the radial direction, wherein the spacer element is accommodated between two securing projections in the peripheral direction. The securing projections serve, in particular, for securing the spacer element in its position in the peripheral direction.

At each first component and at each second component, it is possible to provide at least two second supporting segments, wherein each second supporting segment is supported at the centering element by a spacer element. Furthermore, between the first supporting segments and the centering element, it is possible to provide along the peripheral direction, at least in part, a heat-shielding element, wherein, at the first components and/or at the second components, it is possible to provide a third supporting segment, on which the heat-shielding element rests.

A respective first supporting segment and a respective second supporting element associated therewith can be provided at an essentially identical peripheral position. In particular, respective first and second supporting segments lie opposite to one another in the radial direction, wherein, between them, the associated spacer element and the centering element are accommodated.

Between a respective spacer element and a respective first supporting element associated therewith, it is possible to form a groove for accommodating the centering element. In this case, the groove formed can be smaller than the radial extent of the respective spacer element; in particular, the radial extent of the groove is at most 50% of the radial extent of the spacer element.

The invention further also relates to a gas turbine, in particular an aircraft gas turbine with an above-described turbine center frame, wherein the turbine center frame is arranged between a first turbine stage, in particular a high-pressure turbine, and a following turbine stage, in particular an intermediate-pressure turbine or a low-pressure turbine, wherein the centering element, the first supporting segments, and second supporting segments preferably adjoin the first turbine stage in relation to the main flow direction of the gas turbine.

BRIEF DESCRIPTION OF THE DRAWING FIGURES

The invention will be described below by way of example with reference to the appended figures and without any limitation.

FIG. 1 shows, in a schematic and simplified plan view in the axial direction and, in particular, in an overview and an enlarged detailed view, first and second components of a flow duct of a turbine center frame with the overlapping region thereof and the centering element.

Figure 2A:
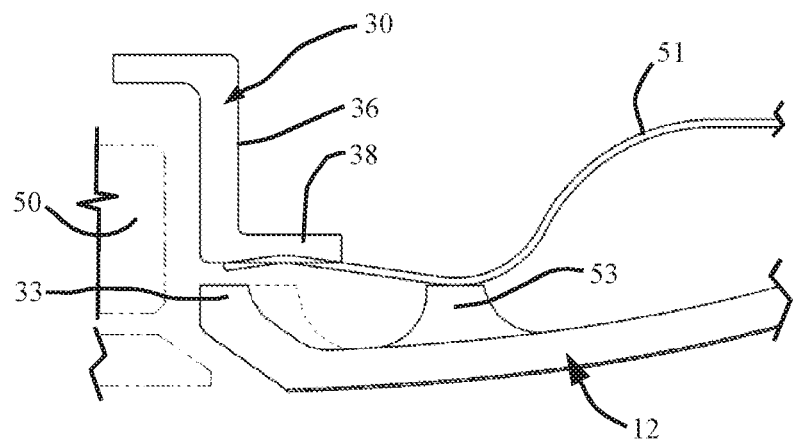
Figure 2B:
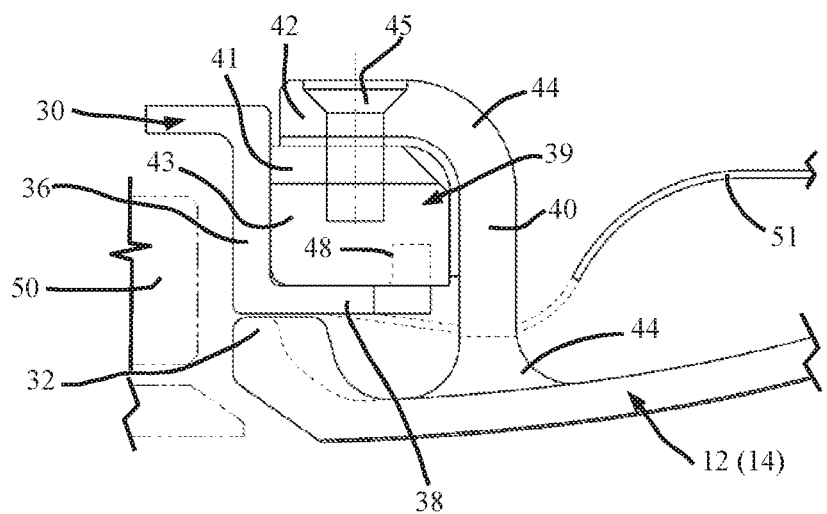
Figure 2C:
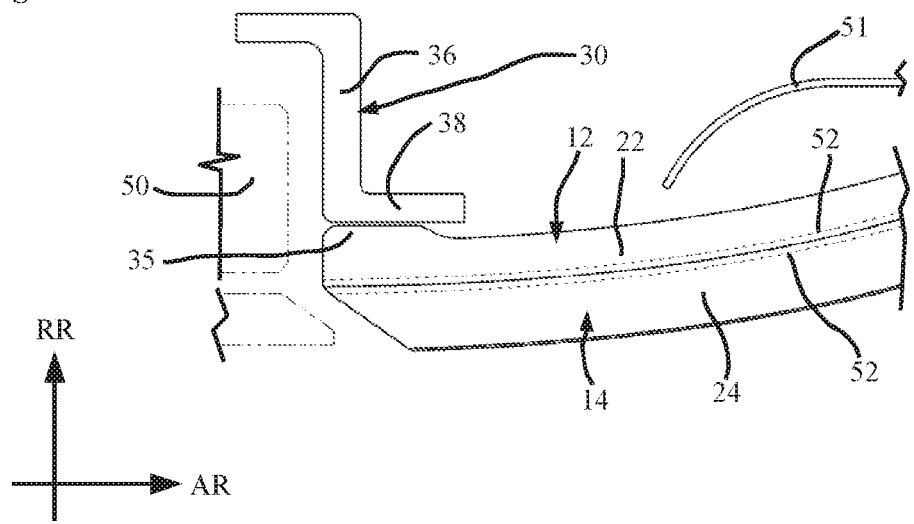

FIGS. 2A, 2B, and 2C show, three enlarged sectional views through the section lines A-A, B-B, and C-C of FIG. 1.

DESCRIPTION OF THE INVENTION

FIG. 1 shows, in a schematic and simplified view in the axial direction, in particular in an overview and an enlarged detailed view (bordered in dot-dashes), first and second components of a flow duct of a turbine center frame with the overlapping region thereof and the centering element.

FIGS. 2A, 2B, and 2C show three enlarged sectional illustrations corresponding roughly to the section lines A-A, B-B, and C-C of FIG. 1.

FIG. 1 shows an excerpt of a turbine center frame 10 having a first component 12 and a second component 14. The first component 12 and the second component 14 are arranged next to each other in the peripheral direction UR. As can be seen from the illustration, an alternating sequence of first components 12 and second components 14 forms an essentially closed ring, only one ring segment of which, however, is illustrated in FIG. 1.

The first components 12 and the second components 14 each have a respective side 16, 18, which faces the flow duct 20 conveying a hot gas. In other words, the first components 12 and the second components 14 bound the flow duct 20 conveying the hot gas. The first components 12 and the second components 14 illustrated here form a radially outer boundary of the flow duct 20 conveying hot gas. On the side facing away from the flow duct 20 conveying hot gas, the components 12, 14 are connected to structural components of the turbine center frame 10 that are not illustrated. It is noted that the components 12, 14 can be inserted not only radially outward with a concave curvature (in relation to the flow duct 20), but also that they can serve as a radially inner boundary of the flow duct conveying hot gas, wherein, in such a case, the components 12, 14 would correspondingly have another curvature (convex in relation to the flow duct 20) than the components 12, 14 illustrated in FIG. 1.

The first components 12 have respective first overlapping segments 22. The second components 14 have respective second overlapping segments 24. At a transition 26 from a first component 12 to a second component 14, the first overlapping segment 22 and the second overlapping segment 24 are arranged one on top of the other in the radial direction RR. The first overlapping segment 22 and the second overlapping segment 24 rest against each other, so that the flow duct 20 conveying hot gas is essentially sealed. The overlap at the transitions 26 is chosen in such a way that, even when there is expansion or contraction of the first components 12 or of the second components 14 due to thermal influence, the overlap is retained. In other words, the first components 12 and the second components 14 can move in relation to one another at least in the peripheral direction UR.

It can be seen from FIG. 1 that the first components 12 and the second components 14 are different in design in this embodiment. The first components 12 are accordingly designed such that their first overlapping segments are arranged radially outward, with the second overlapping segments 24 of the second components 14 always being arranged radially inward.

Also conceivable is a design in which the first components and the second components are constructed identically in such a way that, for example, each component has a radially inner-lying overlapping segment at one peripheral end and a radially outer-lying overlapping segment at the other peripheral end. In such a case, too, it is possible to refer to the identical components as first and second components and, accordingly, these identical first and second components also have respective first and second overlapping segments, wherein, for a first component, both the radially inner-lying overlapping segment and the radially outer-lying overlapping segment can also be referred to as first overlapping segments. The numbering used for the components and the overlapping segments therefore does not presuppose a necessary difference between identically named components, but rather serves essentially only for simpler address and identification in the scope of the present description.

The first components 12 and the second components 14 are made of a ceramic matrix composite, which will be referred to below as a CMC. Because components made of a CMC are produced, as a rule, by lamination of different layers, wherein, in particular, the course of the fibers in accordance with the shaping of the finished component must also be taken into account, it is necessary to configure the first and second components 12, 14 in such a way that both their production from a CMC is possible as well as their centering in relation to the machine axis can be ensured.

For the centering of the first and second components 12, 14, the turbine center frame 10 comprises a centering element 30, at which the first and second components 12, 14 can be supported. The centering element 30 and the arrangement of the first and second components 12, 14 at the centering element 30 will be explained below also with reference to the sectional illustrations of FIGS. 2A, 2B, and 2C.

Both the first component 12 and the second component 14 have respective first supporting segments 32 and respective second supporting segments 34. In this case, the first supporting segments 32 rest against the corresponding centering element 30 from one side, from radially inward in the embodiment. The second supporting elements 34 rest against the corresponding centering element 30 from the other side, from radially outward in the embodiment.

Once again with reference to FIG. 1, it can be seen that the two supporting segments are generally arranged at a distance AB with respect to each other in the peripheral direction UR. In regard to the enlarged excerpt of FIG. 1, the second supporting segment 34 (left in the illustration) of the first component 12 and the second supporting segment 34 of the second component 14 are arranged at a distance AB1 with respect to each other. Between the second supporting segment 34 of the second component 14 and another (adjacent) second supporting segment 34 of the second component 14, a distance AB2 is provided (FIG. 1, right). Furthermore, between the second supporting segment 34 of the first component 12 and another (adjacent) second supporting segment 34 of the first component 12, a distance AB3 is provided (FIG. 1, left). The distances AB1, AB2, AB3 can differ from one another. In the present embodiment, the distance AB1 is the smallest and the distance AB2 is greater than both the distance AB1. The distance AB3 is chosen to be somewhat greater than the distances AB1 and AB2. A distance AB can accordingly be a straight connecting line, which connects two points at the same radial distance from the machine axis, wherein, for example, the two points are arranged roughly centered with respect to an extent of the particular support segment in the peripheral direction.

In the embodiment presented here, the first component 12, as viewed in the peripheral direction UR, has two second supporting segments 34, which are arranged lying opposite to respective supporting segments 32 in the radial direction RR. In other words, the first supporting segments 32 and the second supporting segments 34 are arranged at essentially the same or identical or corresponding peripheral positions. The second component 14 has three second supporting segments 34, only two of which, however, are seen in FIG. 1. It is noted that the number of second supporting segments 34 per component 12, 14 can be varied or can be selected as desired. If, for example, it is conceived that the first and second components 12, 14 are designed as a radially inner boundary of the flow duct conveying hot gas (not illustrated here), then, on account of the smaller circumference, either two supporting segments 34 per component 12, 14 are to be provided or/and the distances between the supporting segments 34 are to be increased or changed.

The centering element 30 has a doubly angled cross section with a sealing segment 36 and a centering segment 38. The sealing segment 36 extends essentially in the radial direction RR and in the peripheral direction UR. The centering segment 38 extends essentially in the axial direction AR and in the peripheral direction UR. The centering segment 38 and the sealing segment 36 are arranged essentially orthogonally to each other. The sealing segment 36 serves, in particular, for limiting fluid flows outside of the flow duct conveying hot gas. The first and second supporting segments 32, 34 of the corresponding first and second components 12, 14 are supported at the centering segment 38.

The sectional illustration of FIG. 2A shows the section corresponding to the section line A-A of FIG. 1. Arranged radially inward of the centering segment 38 is a radial thickening 33 of the first component 12. This radial thickening 33 does not rest against the centering segment 38 in this peripheral direction. In this illustration, a heat-shielding element 51 is also illustrated. The heat-shielding element 51 is arranged here between the centering segment 38 and the first supporting element 32. At its radially outer side, the first component 12 comprises yet a third supporting element 53, at which the heat-shielding element 51 is mounted. Accordingly, it can be stated that the heat-shielding element 51 is accommodated between the centering segment 38 and the third supporting element 53 and, in particular, is clamped in place.

In the region of the section B-B (FIG. 1), which is illustrated in FIG. 2B, the second supporting segment 34 engages behind the centering segment 38 of the centering element 30. The second supporting segment 34 is hook-shaped in form and, in particular, has an L-shape. The second supporting segment 34 has a base segment 40, which is connected to the first component 12, and an engaging segment 42, which is connected with the centering segment 38 by a spacing element 39. The transitions or curvatures 44 between the first component 12 and the base segment 40 or between the base segment 40 and the engaging segment 42 are chosen in this case in such a way that the fibers of the CMC material are correspondingly bent at these points, but not kinked or broken, so that the second supporting segment 34 exhibits a desired stability and strength. In the present example, the second supporting element 34 serves, in particular, to prevent any radially inward movement of the first component 12. It is noted that a second supporting segment 34, which is provided at a second component 14, is formed essentially identically or analogously in the sectional illustration, as is illustrated in FIG. 2A for the second supporting segment 34 of the first component 12; in this respect, FIG. 2B could also correspond to a section along the line B'-B' of FIG. 1.

The spacer element 39 has the form of an angled U-profile (FIG. 1), wherein the base 41 of the U-profile faces the rear-engaging second supporting segment 34 and wherein the angles 43 of the U-profile extend essentially in the radial direction RR and are supported on the centering element 30 or the centering segment 38 thereof. The engaging segment 42 of the second supporting segment 34 and the base 41 of the spacer element 39 are connected by a rivet connection 45. For this purpose, the engaging segment 42 and the base 42 of the spacer element 39 have corresponding openings, through which the rivet 45 is inserted. The centering element 30 is held in the peripheral direction UR by securing segments 48. The securing segments 48 are formed along the peripheral direction UR in sections at the centering segment 38 or the centering element 30, in particular as radial projections. The securing segments 48 serve, in particular, as stops for the centering elements 30 in the peripheral direction UR. Accordingly, any movement of the centering elements 30 in the peripheral direction UR is limited. In this respect, the securing segments 48 serve as a peripheral securing for the centering elements 30. In FIG. 1, although securing elements 48 are illustrated only for one second supporting segment 34 or spacer element 39, it is also possible to provide such securing segments 48 for other (a plurality of) or all other second supporting segments 34.

The sectional view of FIG. 2C shows the section corresponding to section line C-C of FIG. 1 in the transition area 26 between the first component 12 and the second component 14. It can be seen from the illustration that the two overlapping segments 22, 24 are arranged one on top of the other in the radial direction RR. The overlapping segments 22, 24 rest against each other in the overlapping area 26. The first component 12, which is arranged here with its overlapping segment 22 radially outward, has another radial projection 35. This radial projection 35 rests against the centering segment 38 of the centering element 30. In other words, the centering element 30 or its centering segment 38 is impinged on radially inward by the projection 35. The radial projection 35 forms, in particular, a kind of extension of the first supporting segment 32 in the peripheral direction.

The first supporting segment 32 of the first component (FIG. 2B) and the first radial projection 35 of the second component (FIG. 2C) differ essentially only in terms of their radial extent or thickness. Their function and the kind of design as a projection or thickening are essentially identical.

From viewing FIGS. 1 and 2A, 2B and 2C in juxtaposition and from the arrangement of first and second supporting segments 32, 34 that thereby ensues, it can be seen that, in this way, the first and second components 12, 14 are supported at the corresponding centering element 30, in particular at its centering segment 38, in such a way that they are essentially immobile in relation to the centering element 30 in the radial direction RR. Therefore, the arrangement of first supporting segments 32 and second supporting segments 34, each of which impinge against the centering segment 38 from different sides (from radially inward or radially outward), makes possible a desired centering of the first and second components 12, 14 with respect to a machine axis. Furthermore, as a result of this radial fixation, any radial outward tilting of the components 12, 14, in particular in the transition region 26 (overlap), is prevented.

For completeness, it is additionally noted that, in FIGS. 2A, 2B, and 2C, a so-called securing ring 50 is illustrated, by way of which the centering element 30 is limited in its axial movement or is held, for example, in any desired position. Furthermore, in FIG. 2C, dashed lines 52 are illustrated for the overlapping regions 22, 24. Said dashed lines 52 show, in a purely schematic manner, a material thickening at the corresponding points of the components 12, 14, wherein these material thickenings 52 can be removed as needed in order to be able to compensate for tolerances during the final assembly of CMC components.

The centering of components 12, 14 illustrated here is provided at the front or at an inlet opening with respect to a main flow direction in the turbine center frame 10. Such an inlet opening follows, as a rule, a first turbine stage, in particular a high-pressure turbine. The first and second components 12, 14 illustrated here, together with their first and second supporting segments 32, 34, are produced from a ceramic matrix composite (CMC), wherein the form and arrangement of the supporting segments 32, 34 is chosen such that they can be produced from a CMC and meet the strength and stability requirements required for their function. In this case, the provision of a spacer element 39 represents an adjustable option for the fastening of second supporting segments 34 at the centering element 30. In particular, the spacer element 39 can be adjusted in terms of its dimensions also to other centering elements or other second supporting segments. However, it is also conceivable that, along the periphery, not only identical spacer elements 39 are utilized, as is the case in the exemplary embodiment illustrated, but also the spacer elements 39 are differently dimensioned, for instance, when a sealing segment 36 of the centering element 30 is designed to be shorter in the radial direction. The rivet connection 45 illustrated in FIG. 2B is an exemplary option for the connection between the second supporting segment 34 and the spacer element 39. This connection could also be produced in a material-bonded manner and, in particular, in an adhesive-bonded manner.

It would be appreciated by those skilled in the art that various changes and modifications can be made to the illustrated embodiments without departing from the spirit of the present invention. All such modifications and changes are intended to be covered by the appended claims.

What is claimed is:

1. A turbine center frame for an aircraft gas turbine, comprising:

a plurality of first components and a plurality of second components, which, in a peripheral direction, are arranged alternately next to one another and, in a radial direction, bound a flow duct conveying hot gas, wherein the plurality of first components each have two first overlapping segments and the plurality of second components each have two second overlapping segments in such a way that, in a respective region of a transition from one of the plurality of first components to one of the plurality of second components or vice versa, each of the two first overlapping segments and each of the two second overlapping segments are arranged overlapping, wherein the plurality of first components are identical in design to the plurality of second components or the plurality of first components differ from the plurality of second components, and with at least one centering element, at which the plurality of first components and the plurality of second components are supported along the peripheral direction and in the radial direction so that the plurality of first components and the plurality of second components are arranged essentially centered with respect to a central axis of the turbine center frame, wherein the plurality of first components and the plurality of second components are made of a ceramic matrix composite, and, at each of the plurality of first components and at each of the plurality of second components, at least one first supporting segment and at least one second supporting segment are provided, the at least one first supporting segment and the at least one second supporting segment impinge against the at least one centering element from different sides in the radial direction, and wherein the at least one second supporting segment impinges against the at least one centering element by a spacer element.

2. The turbine center frame according to claim 1, wherein the at least one first supporting segment and the at least one second supporting segment are made of a ceramic matrix composite.

3. The turbine center frame according to claim 1, wherein the at least one first supporting segment is a radial projection and is a radial thickening of a corresponding one of the plurality of first components or of a corresponding one of the plurality of second components.

4. The turbine center frame according to claim 3, further characterized in that the radial projection impinges on the at least one centering element in the radial direction from a first side.

5. The turbine center frame according to claim 1, wherein the at least one second supporting segment is hook-shaped.

6. The turbine center frame according to claim 5, wherein the hook-shaped at least one second supporting segment engages behind the spacer element and impinges in the radial direction from a second side.

7. The turbine center frame according to claim 1, wherein the at least one centering element has a centering segment that extends in the axial direction and in the peripheral direction, wherein the at least one first supporting segment and the spacer element each rest against the at least one centering segment on opposite-lying sides of the centering segment, and wherein the at least one second supporting segments rests against the spacer element.

8. The turbine center frame according to claim 1, wherein the spacer element is dimensioned in such a way that it bridges a radial distance between the at least one second supporting segment and the at least one centering element.

9. The turbine center frame according to claim 8, wherein the spacer element is connected to the at least one second supporting segment by a rivet connection.

10. The turbine center frame according to claim 8, wherein the spacer element has the form of an angled U-profile, wherein a base of the U-profile faces a rear-engaging at least one second supporting segment, and wherein arms of the U-profile extend essentially in the radial direction and are supported on the at least one centering element.

11. The turbine center frame according to claim 1, further comprising securing projections, which extend essentially in the radial direction, are provided at the at least one centering element, wherein the spacer element is accommodated in the peripheral direction between two securing projections.

12. The turbine center frame according to claim 1, wherein at each of the plurality of first components and at each of the plurality of second components, at least two second supporting segments are provided, wherein each of the at least two second supporting segments is supported at the at least one centering element by a respective spacer element.

13. The turbine center frame according to claim 1, wherein between the at least one first supporting segment and the at least one centering element, along the peripheral direction, a heat-shielding element is arranged at least in part, wherein, at one of the plurality of first components or at one of the plurality of second components, a third supporting segment, on which the heat-shielding element lies, is positioned.

14. The turbine center frame according to claim 1, wherein a respective at least one first supporting segment and a respective at least one second supporting segment associated therewith are provided at a substantially identical peripheral position.

15. The turbine frame according to claim 1, wherein the turbine center frame is located between a first turbine stage and a second turbine stage of a gas turbine, wherein the at least one centering element, the at least one first supporting segment, and the at least one second supporting segment adjoin the first turbine stage in relation to a main flow direction of the gas turbine.

16. The turbine frame according to claim 15, wherein the first turbine stage is a high-pressure turbine.

17. The turbine frame according to claim 15, wherein the second turbine stage is an intermediate-pressure turbine or a low-pressure turbine.

18. The turbine frame according to claim 15, wherein the gas turbine is an aircraft gas turbine.

\* \* \* \* \*